(12) United States Patent
Müser et al.

(10) Patent No.: US 6,630,232 B1
(45) Date of Patent: Oct. 7, 2003

(54) METHOD FOR MANUFACTURING A MULTI-LAYER MATERIAL AND MULTI-LAYER MATERIAL

(75) Inventors: Peter Müser, Kleinostheim (DE); Willi Seiss, Faulbach (DE)

(73) Assignee: Schuller GmbH, Wertheim (DE)

( * ) Notice: Subject to any disclaimer, the term of this patent is extended or adjusted under 35 U.S.C. 154(b) by 41 days.

(21) Appl. No.: 09/717,008

(22) Filed: Nov. 22, 2000

(30) Foreign Application Priority Data

Nov. 23, 1999 (DE) .......................... 199 56 152

(51) Int. Cl.$^7$ .................. B32B 5/22; B32B 15/04; D04H 1/00
(52) U.S. Cl. ................ 428/317.9; 428/311.11; 428/292.1; 428/297.4
(58) Field of Search .................. 428/311.11, 317.9, 428/292.1, 297.4

(56) References Cited

U.S. PATENT DOCUMENTS

| 4,279,954 A | * 7/1981 | Johnard ................. 428/158 |
| 5,066,685 A | * 11/1991 | Hanak et al. ............. 521/163 |

FOREIGN PATENT DOCUMENTS

| DE | 3521828 A1 | * 2/1987 |
| EP | 0248199 A2 | * 4/1987 |

OTHER PUBLICATIONS

Derwent Abstract of DE 3521828 A.*
Derwent Abstract of EP 248199 A.*

* cited by examiner

Primary Examiner—Daniel Zirker
Assistant Examiner—Victor S. Chang
(74) Attorney, Agent, or Firm—Burns, Doane, Swecker & Mathis, L.L.P.

(57) ABSTRACT

A multi-layer material, useful as a preformed part for the inside roof lining of an automobile, with a plastic foam core which is incorporated with a partially disintegrated fiber reinforcement, and at least one top layer.

13 Claims, 1 Drawing Sheet

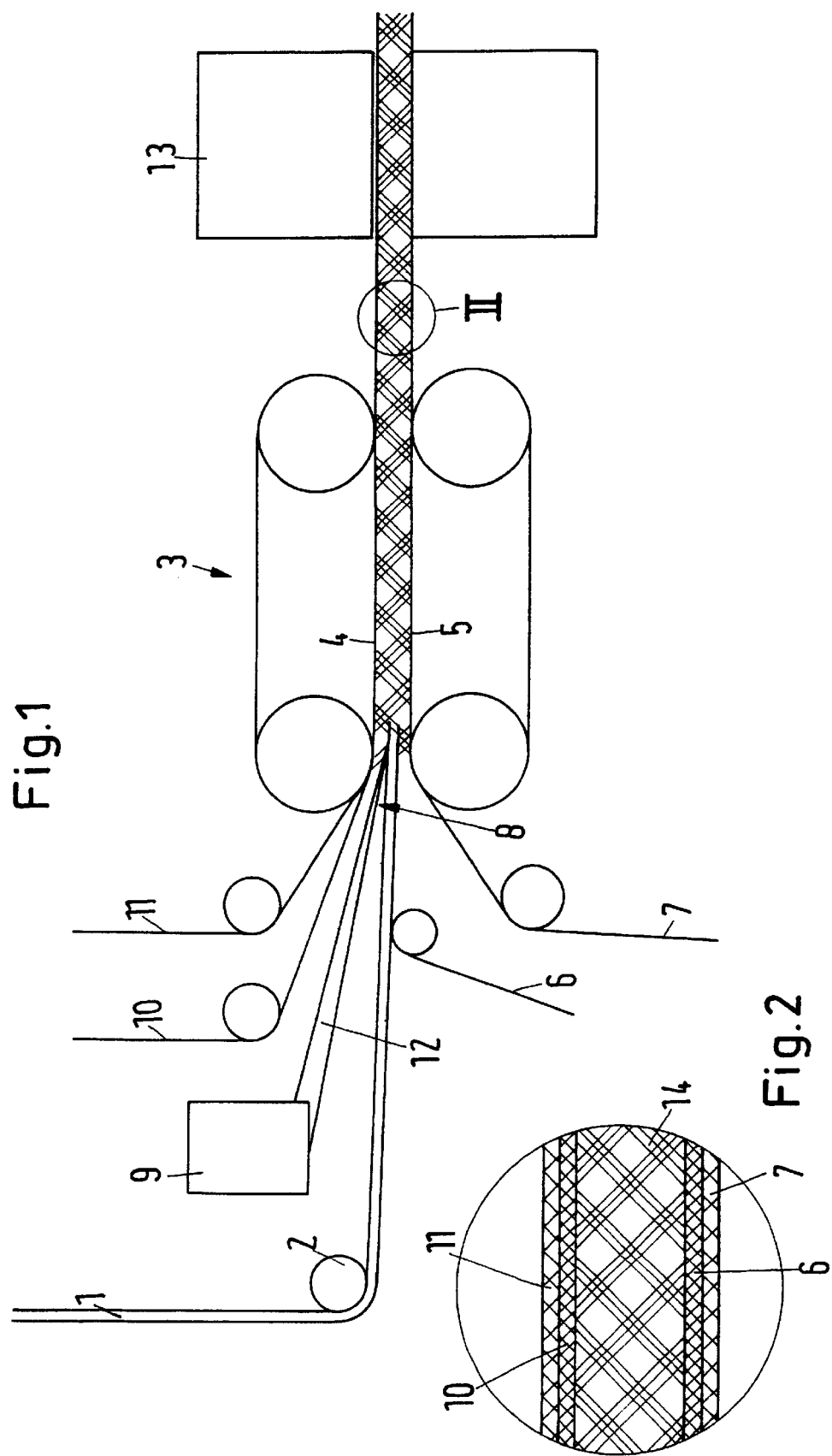

METHOD FOR MANUFACTURING A MULTI-LAYER MATERIAL AND MULTI-LAYER MATERIAL

This application claims priority under 35 U.S.C. §§ 119 and/or 365 to Application Ser. No. 199 56 152.4 filed in Germany on Nov. 23, 1999; the entire content of which is hereby incorporated by reference.

BACKGROUND AND SUMMARY

The invention refers to a method for manufacturing a multi-layer material, particularly as a preformed part for the inside roof lining of an automobile, where a plastic foam material is equipped with a fiber reinforcement and at least one top layer. Furthermore, the invention refers to a multi-layer material, particularly as a preformed part for the inside roof lining of an automobile, which contains a plastic foam layer with a top layer on at least one side and a fiber reinforcement.

A preferred application area for the invention is the manufacturing of a preformed part for the inside roof lining of an automobile. The invention will be illustrated accordingly in this context. It is, however, also applicable in other cases, for example for the interior molding of vehicles or for the interior lining of containers.

With the development of the self-supporting one-piece interior automobile roof lining, which is supplied to the vehicle manufacturer as a preformed and installable part, began the change from the purely decorative covering to a "multifunctional" unit that, for example, can also be used for optical display elements or as covering and seating element for a head airbag. The inside automobile roof lining is often manufactured from a multi-layer material that initially is just a sheet material and is then formed into the "correct" shape through the application of pressure and heat.

EP 0 248 199 B1 displays a multi-layer lining element with a core of polyurethane rigid foam as the base layer. Both sides of this base layer are equipped with a coat of an acrylonitrile-butadiene-styrene foil. The polyurethane base layer has been bonded to the coat with a foaming process. On the visible side, a decorative coat is glued on with the help of a bonding sheet. With this lining element, the glass fibers used up to now are replaced by thermoplastics.

DE 35 16 132 C2 describes a multi-layer, molded interior lining for passenger cars, particularly an inside roof lining, where glass fiber mats are applied to the interior foam layer on both sides. When such a material is subject to deformation, the risk that the glass fibers stretch excessively and that voids are created arises.

DE 35 21 828 C2 describes a method for manufacturing preformed polyurethane foam parts reinforced with fibrous web mats, which can be used for example as interior lining in vehicles.

For this, several glass fiber mats are inserted into a form tool, while adding an intermediate sisal fiber mat layer, and a reaction mixture, which fills in the cavity within the fibrous web mats and forms a polyurethane foam, is placed in the cavity of the form tool.

OBJECTS AND SUMMARY OF THE INVENTION

The task of the invention is to simplify the manufacturing process of a multi-layer material.

This task is resolved with the method mentioned previously in which a fibrous web is combined with a free-flowing mixture of foaming components and is then run through a belt press.

With this design, a continuous process can be realized. The foaming components can penetrate the fibrous web as long as they are still in the free-flowing state. During the subsequent building of the foam, the fibrous web is located in the middle of the foam. The expansion of the foam is defined through the belt press. Placement of the fibers in the middle of the foam prevents dangerous and rigid fiber bundles and edges, which can e.g. lead to significant injuries after the material breaks due to the release of a head air bag. In addition, the risk of damage in subsequent forming and pressing processes is significantly reduced. The fibers are mainly located in the center of the foam layer and are therefore protected by the foam layer.

Basically all foaming materials can be used for the foam, particularly polyurethane in which the free-flowing mixture is made up of polyhydric alcohol and isocyanate and corresponding catalysts. However, polyester is also a possible foaming material. The fibrous web is preferably a glass fiber web. Polyester fibrous webs are possible as well.

Preferably, the top layer is tight against to the mixture and the foam that will develop from it, and the top layer is run through the belt press together with the saturated fibrous web. This design prevents soiling of the belt press from the foam. At the same time, the top layer is firmly glued together with the foam. This way, a very homogeneous material is obtained with good usage properties. Usually both sides of the foam are equipped with the top layer. The top layers then form the outer surfaces of the foam layer.

Preferably, a bonding sheet is selected as the top layer and another sheet material is run through the belt press along with it on the outer side. The bonding sheet itself can be adhesive already. It is also possible for it to become adhesive only due to the reaction temperature occurring during the foaming process. For example a modified PE-foil can be used, which softens with the reaction temperature and then serves as an adhesive for the other sheet material. After running through the belt press, i.e. virtually with a single process, the multi-layer material is available.

In a preferred version, a counteracting material is applied to one side as a sheet material, and a decorative material is applied to the opposite side. The multi-layer material is then already complete for further processing into an inside roof lining for an automobile or into another interior covering part.

The foaming components are preferably added shortly before the belt press so that the majority of the foaming process occurs within the belt press. This presents several advantages. For one, the dimensional exactness of the multi-layer material can be controlled better because the belt press limits the expansion of the foam during the foam reaction. The second advantage is that a lower amount of feeding force is required because the foamed material must no longer be pressed together. Finally the consistency or the inner structure of the foam can also be better controlled. If necessary, the fibrous web can already be equipped with a first component farther away from the belt press and then with a second component shortly before the press if it is the second component, for example a catalyst, that starts the foam reaction.

It is beneficial to select a glass fibrous web with a binding agent percentage in the area of 0.1% to 20%, particularly from 0.1% to 7%. The lower the binding agent percentage is, the better the foaming components can enter and penetrate into the glass fibrous web. Usually, the binding agent is then only located on the crossing points between the glass fibers. The spaces between the glass fibers on the other hand are free for absorption of the foaming components. In addition, this has the advantage that the foam can build so that the pores formed during this process mainly settle in the spaces between the glass fibers. The small "gas bubbles" or voids are not destroyed right away through the glass fibers. With this, relatively thick multi-layer materials can be realized. Additionally, a low binding agent percentage has the advantage that the glass fibrous web can be handled more easily. In particular it can be unwound from a roll.

It is advantageous to select a glass fibrous web with a thermoplastic binding agent whose glass temperature is below a reaction temperature for foam building. At the glass temperature, the binding agent loses its binding characteristics, or "adhesive power," at least partially. During the foaming process, this leads to a partial disintegration of the compound-formed fabric and to a "mixing" of the inner area of the foam matrix with fiber material. This improves the possibility of foaming because the bubbles created can push away the glass fibers, which are no longer bonded or no longer completely bonded, without being damaged. This way, the fibers become movable during the foaming process so that the risk of damage during a subsequent molding process and the "degradation" of the reinforcement in bending and edge areas are reduced. The strength and stability of the material is improved. A reinforced foam matrix will result, which has improved acoustic insulation and an improved passive safety without expecting any loss of stability or other characteristics. In particular, no sharp edges are created when a head airbag is released.

The task is resolved with a multi-layer material of the kind described above in which the fiber reinforcement is formed by a fibrous web, which exists in the foam in a partially disintegrated form.

As explained above in connection with the manufacturing method, such a multi-layer material excels through the fact that, on the one hand, it is equipped with a fiber-reinforced foam, which displays good sound-dampening behavior and great strength, but that on the other hand it still has good forming and handling properties. In particular, the partial disintegration of the fibrous web enables good forming behavior.

Preferably, the fibrous web has a binding agent percentage in the area of 0.1 to 20%, particularly from 0.1% to 7%. The lower the binding agent percentage is, the better the foam can penetrate into the fibrous web.

It is particularly preferred if the binding agent is a thermoplastic binding agent with a glass temperature that is below a reaction temperature at the foaming process. Upon manufacture of the web and during transport, the binding agent holds together the fibers of the fibrous web as long as is required. However, if the foam encloses the fibers of the web, cohesion is no longer required or not to this extent. The binding agent can then soften and reduce or lose its adhesive power so that after the foaming process the fibers take on a position that is optimal for the foam.

Preferably, the top layer has the design of a bonding sheet, onto which an additional sheet material is glued. This way, a very compact and cohesive multi-layer material is obtained, which can be used directly for the production of interior limngs.

BRIEF DESCRIPTION OF THE DRAWINGS

The invention is described more closely in the following with a preferred version in connection with the drawing. They show:

FIG. 1 a device for manufacturing a multi-layer material; and

FIG. 2 an enlarged cross-sectional view through the multi-layer material.

DETAILED DESCRIPTION OF THE INVENTION

From a stored position that is not defined in detail, for example a roll, a glass fibrous web 1 is fed via a deflector roll 2 to a belt press 3, which has a defined distance between two belts 4, 5. If required, the belts can also be supported by supporting surfaces, which are not shown in detail. The gap between the two belts 4, 5 is fed not only the glass fibrous web 1, but also from underneath a first foil 6 made of modified polyethylene (PE) and a counteracting material 7, for example polyester spunbonded fabric. For this, the foil 6 is fed in front of a position 8, where foaming materials are applied onto the glass fibrous web in liquid form. These materials can be for example polyhydric alcohol and isocyanate and corresponding catalysts, which form a polyurethane foam upon reaction. Prior to that, these materials are processed in a mixer 9. Instead of the polyurethane foam, a polyester foam can also be utilized.

A foil 10 made of a modified polyester is also fed from above, as is a decorative material 11.

The figure shows that the mixer 9 is arranged in front of the entrance of the belt press and that the mixture of foaming components is fed into the gap of the belt press 3 via a feeding line 12. Of course the mixer 9 can also be arranged at the side of the belt press 3 in order to keep the feeding path short.

A glass fibrous web has an a real weight in the area of 25 to 450 g/m$^2$, preferably from 250 to 350 g/m$^2$. It is manufactured in the known way, and a thermoplastic binding agent in the area of 0.1 to 20%, preferably 0.1 to 7%, relative to the overall weight of the web, is added. The thickness of the web is in the range of 1 to 5 mm.

The two foils 6, 10 are impenetrable towards the foaming components and towards the foam. They keep the foam from soiling the belt press or fluid from bleeding through. When the foaming components—for example, a mixture of polyhydric alcohol and isocyanate and corresponding catalysts—are added to the glass fibrous web 1, this free-flowing mixture can penetrate the glass fibrous web 1, but cannot bleed downward because it is held there by the modified PE-foil 6. The foaming components are applied shortly before the belt press 3 so that the foaming process does not occur before the area between the belts 4, 5.

The two belts 4, 5 therefore limit the expansion of the foam.

During the foaming process, or more precisely the chemical reaction associated with or preceding it, an increased reaction temperature is generated. The glass fibrous web 1 is equipped with a thermoplastic binding agent, whose glass point or temperature is lower than the reaction temperature of the foam. This can be a modified polyester, for example. Due to the increased reaction temperature, the bonds disintegrate on the crossing points between the individual glass fibers. During the foaming process, the glass fibers can therefore be moved so that, for example, individual bubbles can form in the foam without being destroyed immediately by the glass fibers. This results basically in a natural optimum when it comes to the arrangement of the glass fibers in the foam and in a mixing of the interior area of the foam matrix created this way with the fiber material. This way, the dangerous, rigid fiber bundles and edges, which could lead to considerable injuries for example when they break, are avoided.

Subsequent forming and pressing processes are less critical with a material manufactured this way because the reinforcement fibers, which are mainly located in the center of this compound, and the "moveability" of the fibers at increased temperatures reduce the risk of damage and the "degradation" of reinforcement fibers in the bending and edge areas.

The increased reaction temperature also softens the PE-foils 6, 10. Therefore they not only bond tightly and homogeneously with the foam, but serve at the same time as a gluing basis for the counteracting materials 7 and the decorative layer 11.

A glass fibrous web of 280 g/m$^2$ and having a width of 135 cm was produced with known methods in the way described and equipped with 3% of a thermoplastic binding agent. The glass fibers have a diameter in the area of 8 to 16 mm, preferably 13 mm, and an average length of 16 mm. The thickness of the web is 2.8 mm. Strength was determined to be 180 N/5 cm. To the web thus manufactured, a mixture of polyhydric alcohol, isocyanate and catalyst was added and fed to the belt press 3 of 35 cm length together with two PE-foils. The running speed was 23 m/min. The adjusted thickness was 4 mm.

After the belt press 3, the material thus obtained can be cut into panels with the help of a cutting device 13. The panels thus manufactured allowed easy forming without incurring damage. A cross-cut resulted in relatively soft corners, which were very resilient.

FIG. 2 shows a cross-sectional diagrammatic view in accordance with section II of FIG. 1. Here, a core 14 of PU-foam is used, into which glass fibers are embedded as reinforcement material.

We claim:

1. A multi-layer material product, suitable for use as a preformed part of the inside roof lining of an automobile, comprising a plastic foam core layer having a top layer disposed on one side and a fiber reinforcement, contained within the foam layer wherein the fiber reinforcement is formed by fibrous web which takes on a partially disintegrated form in the foam.

2. The material product in accordance with claim 1, wherein the fibrous web has a binding agent in the range of 0.1 to 20 percent.

3. The material product in accordance with claim 1, wherein the fibrous web has a binding agent in the range of 0.1 to 7 percent.

4. The material product in accordance with claim 1, wherein the fibrous web has a thermoplastic binding agent having a glass transition temperature that is below a reaction temperature during the foaming process.

5. The material product in accordance with claim 1, wherein one or more top and bottom layers are bonding sheets, onto which additional sheet materials are glued.

6. A process for manufacturing the multi-layer material product of claim 1, comprising adding a free-flowing mixture of foaming components to a fibrous web and running the composite through a belt press.

7. The method according to claim 6, further comprising drawing the top layer tight towards the mixture and the foam generated and wherein the top layer is run through the belt press together with the saturated fibrous web.

8. The method according to claim 7, wherein a bonding sheet is selected as the top layer and another sheet material are passed through the belt press.

9. The method according to claim 8, further comprising applying a counter-acting material as a sheet material on one side and applying a decorative material to the opposite side.

10. The method according to claim 6, wherein the foaming components are added just before entry into the belt press in order for a majority of the foaming process to occur within the belt press.

11. The method according to claim 6, wherein the glass fibrous web includes a binding agent in a range of 0.1 to 20 percent.

12. The method according to claim 6, wherein the glass fibrous web includes a binding agent in a range of 0.1 to 7 percent.

13. The method according to claim 11, further comprising:

providing a glass fibrous web with a thermoplastic binding agent, having a glass temperature below the reaction temperature during the foaming process.

\* \* \* \* \*